United States Patent
Huang et al.

(10) Patent No.: US 9,304,047 B2
(45) Date of Patent: Apr. 5, 2016

(54) TECHNOLOGY AND DEVICE FOR PRECISELY MEASURING TEMPERATURE OF CABLE JOINT ON THE BASIS OF RADIO FREQUENCY TECHNIQUE

(75) Inventors: Qiang Huang, Hangzhou (CN); Chengcai Wu, Hangzhou (CN)

(73) Assignee: Zhejiang Tuwei Electricity Technology Co., Ltd., Hangzhou, Zhejiang Province (CN)

( * ) Notice: Subject to any disclaimer, the term of this patent is extended or adjusted under 35 U.S.C. 154(b) by 468 days.

(21) Appl. No.: 13/142,415

(22) PCT Filed: Feb. 24, 2011

(86) PCT No.: PCT/CN2011/000287
§ 371 (c)(1),
(2), (4) Date: Oct. 26, 2011

(87) PCT Pub. No.: WO2012/062022
PCT Pub. Date: May 18, 2012

(65) Prior Publication Data
US 2012/0268290 A1    Oct. 25, 2012

(30) Foreign Application Priority Data
Nov. 11, 2010   (CN) .......................... 2010 1 0540305

(51) Int. Cl.
| | | |
|---|---|---|
| G08B 23/00 | (2006.01) | |
| G08C 15/06 | (2006.01) | |
| G08C 19/22 | (2006.01) | |
| H04Q 9/00 | (2006.01) | |
| G01K 15/00 | (2006.01) | |
| G01K 19/00 | (2006.01) | |
| G01C 25/00 | (2006.01) | |
| G01F 25/00 | (2006.01) | |
| G06F 19/00 | (2011.01) | |
| G01K 1/14 | (2006.01) | |
| G01K 1/02 | (2006.01) | |

(52) U.S. Cl.
CPC . *G01K 1/14* (2013.01); *G01K 1/024* (2013.01)

(58) Field of Classification Search
CPC ........... H04Q 2209/47; G01R 19/2513; G01R 15/146; H02J 13/0075; G01K 11/265; H04B 2203/5458
USPC ........................................... 702/99, 104, 132
See application file for complete search history.

(56) References Cited

U.S. PATENT DOCUMENTS

| | | | |
|---|---|---|---|
| 7,187,275 B2 * | 3/2007 | McCollough, Jr. .... | G01R 31/08 340/517 |
| 2006/0040546 A1 * | 2/2006 | Werthman ......... | H01R 13/7137 439/488 |

(Continued)

*Primary Examiner* — Firmin Backer
*Assistant Examiner* — Jerold Murphy
(74) *Attorney, Agent, or Firm* — Drinker Biddle & Reath LLP

(57) ABSTRACT

The invention provides a method and a device for on-line measuring the inner temperature of a cable joint, the device includes a built-in temperature measurer and an outside receiver. The built-in temperature measurer measures the temperature of the cable joint or a core wire surface by means of direct contact measuring method, and transmits the data to the outside receiver through an insulating layer by means of the radio frequency identification technique. At the same time, the outside receiver supplies power energy to the built-in temperature measurer by means of the radio frequency signal, so it resolves the problem of supplying power to the built-in temperature measurer. The device of the invention has the advantage of accurately measuring temperature, small volume, superior applicability and so on.

5 Claims, 4 Drawing Sheets

(56) References Cited

U.S. PATENT DOCUMENTS

2006/0238307 A1* 10/2006 Bauer .................. G06K 7/0008
                                                          340/10.1
2008/0122642 A1* 5/2008 Radtke ............. G01R 19/16547
                                                           340/660
2012/0197558 A1* 8/2012 Henig .................. G01K 11/265
                                                            702/58

* cited by examiner

TECHNOLOGY AND DEVICE FOR PRECISELY MEASURING TEMPERATURE OF CABLE JOINT ON THE BASIS OF RADIO FREQUENCY TECHNIQUE

FIELD OF THE INVENTION

This invention relates to the field of electric power detection, and the invention is provided for measuring temperature of a cable joint and preventing cable accident.

BACKGROUND

At present, high-voltage transmission lines are distinguished into two types: overhead lines and underground cables. Along with the development of urbanization, however, people try to change the overhead lines to the underground cables in more and more cities. Because the cables are under ground and hidden, and they are taken on heavy power transmission task, how the underground cables are ensured to be safe and reliable has been paid attention by the power supply department in each city.

The underground cables always need connect two cable segments together during building and mounting. Due to the technical limitation, contact resistance is produced unavoidably. For cables that undertake high-current transmission, the joints are heated easily due to the contact resistance, so insulating layers are aging rapidly, and arc-over accident may be occurred before the design service life, which could induce fire hazard in serious event. This type of accident is unpredictable, and it always results in extensive power blackout, which can be dangerous to safety in production, and it can make large economic losses.

Because the change of the cable joint's temperature is continuous and slow, there is long time from the joint overheated to the accident happened to take measures for avoiding the accident, so that the lines' safety can be ensured. For this purpose, it is necessary to set up a real-time on-line monitoring system to record the real and continuous temperatures of the underground cable joints, which not only can dynamically monitor the temperature change of the joints, but also can offer the historical data comparison and evaluate and analyze the condition. So the parametric variation and the prewarning information can be offered on time before the accident happens, and the relevant departments are warned to check the lines' safety and take necessary measures for prevention. The loss of the cable accident can be mostly minimized. Now, the domestic technicians attempt to implant optical fibers into the cables to utilize the physical feature that the refractive index of the optical fiber changes when the temperature changes to research on-line temperature detect of the cables. But in practice, many of non-fiber cables are utilized, so the solution of implanting the optical fibers into the cables can not radically resolve the problem of on-line temperature detect of the cables. Secondly, according to the practical structure of implanting the optical fibers into the cables and the usage condition, when using the optical fibers to measure temperatures, the measured values are the temperatures of the parts where the optical fibers are implanted into the cable structural layer, but not the real temperatures of the conductor cores of the cables. Thirdly, the fiber-implanted cables experience large traction force and stretch when laid down underground, and flexural deformation occurs at the same time, so the optical fibers are liable to break off and lose all the functions. So, the application of the on-line temperature measurement technique realized by implanting the optical fibers into the cables is restricted, and the measurement technique can not radically meet the requirements of accurately measuring temperatures of the intermediate cable joints.

SUMMARY OF THE INVENTION

The present invention provides a method and a device for measuring temperatures of intermediate cable joints, the device can work at high-temperature and high-pressure environment, accurately measuring temperatures of conductor cores of the cables, and transmit the measured temperature signal through insulating layers (silicone rubber etc.) by means of the RFID technique. At the same time, the device does not damage the insulating and shielding structure of the original cables during measuring temperature and transmitting data, which is key technology and essential matter of the invention.

The inventive device includes a built-in temperature measurer and an outside receiver etc., wherein the built-in temperature measurer is located between a copper connection pipe connecting two cable joint segments and an insulating sleeve, the outside receiver is located outside the insulating sleeve. The built-in temperature measurer includes a temperature sensor, a temperature transform circuit, a radio frequency induction coil, a radio frequency interface circuit and a MCU control circuit, etc. The temperature sensor contacts with the copper connection pipe of the cable joint directly. The temperature sensor can be a thermocouple, a platinum resistor, or a semiconductor means.

The outside receiver includes a radio frequency transmission and interface circuit, a radio frequency signal antenna, a MCU control circuit, and a remote communication interface circuit. The radio frequency signal antenna is made up of a set of receiving coils circularly disposed around outer fringe of the built-in temperature measurer, one or more magnetic core coils are used to connect in series as a receiving coil and placed outside the built-in temperature measurer along one side or more sides.

The outside receiver has the function of radio frequency identification reader, the built-in temperature measurer has the function of responser. The built-in temperature measurer is located in a joint portion connecting two cable segments and placed between the copper connection pipe connecting with inner copper core wires and the insulating sleeve. The built-in temperature measurer hasn't an external power source, all the inner circuits are supplied power by the outside receiver in the electromagnetic induction mode. The temperature sensor contacts with the detected cable directly, the measuring temperature value is transmitted to the outside receiver by means of the radio frequency, and the outside receiver has a wired or wireless remote communication interface.

The outside receiver is isolated from the built-in temperature measurer by an insulating jacket. There is not a conducting wire connecting with the outside receiver and the built-in temperature measurer directly, so the original insulating structure is not damaged.

The outside receiver has a remote communication interface circuit, the interface can be a remote data interface of RS485, RS232, CAN, optical fiber, GPRS and GSM, etc. The temperature data can be transmitted to a computer, a mobile telephone and another terminal on the distal end by the interface.

An object of the invention is to provide a method for measuring temperature of a power cable joint where a temperature measuring device is provided which includes a built-in temperature measurer and an outside receiver, wherein The built-in temperature measurer is located between a copper connection pipe connecting two cable joint segments and an insulating sleeve, the outside receiver is located at another position outside the insulating sleeve, information exchange and energy transmission can be carried out by means of radio frequency identification technique, the outside receiver has a radio frequency antenna for radio frequency transmission for receiving the transmitted temperature data and transferring the data to a identification reader of a secondary transmitter, the built-in temperature measurer includes a radio frequency identification responser for radio frequency identification response, the radio frequency identification responser includes a radio frequency antenna for communicating with the outside receiver, the built-in temperature measurer doesn't have an external power source, all the circuits in the built-in temperature measurer are supplied power by the outside receiver in the electromagnetic induction mode;

The outside receiver can be separated from the radio frequency antenna, the radio frequency antenna is placed on the basis of the corresponding position of the built-in temperature measurer, the mounting position of the outside receiver can be adjusted on the basis of the joint structure, the outside receive connects to the radio frequency antenna via a conducting wire;

A temperature sensor contacts with the detected cable core or copper connection pipe directly, the measuring temperature value is transmitted to the outside receiver via the radio frequency antenna by means of the radio frequency, and the outside receiver has a wired or wireless remote communication interface;

characterized in that the method includes the following steps:

The temperature data in the intermediate cable joints is collected by the built-in temperature measurer;

The collected original data is processed and then the signal is transmitted by means of the radio frequency;

The transmitted signal is received by the outside receiver in the corresponding receiving mode, and then input and transferred to the identification reader.

Another object of the invention is to provide a temperature measuring device for a power cable joint, characterized in that the temperature measuring device includes a built-in temperature measurer and an outside receiver, wherein The built-in temperature measurer is located between a copper connection pipe connecting two cable joint segments and an insulating sleeve, the outside receiver is located at another position outside the insulating sleeve, an outside receiver antenna is independent of the receiver, and placed for centrically corresponding to a built-in temperature measurer antenna, they are spaced apart via an insulating layer, and information exchange and energy transmission between them can be carried out by means of radio frequency identification technique;

The outside receiver transmits the radio frequency signal via the radio frequency antenna and supplies power energy to the built-in temperature measurer, at the same time, the outside receiver communicates information with the built-in temperature measurer. The built-in temperature measurer doesn't have an external power source, all the circuits in the built-in temperature measurer are supplied power by a radio frequency induction coil receiving the radio frequency signal transmitted by the outside receiver and through a power supply transform circuit.

According to a further object of the invention, wherein the built-in temperature measurer includes a temperature sensor, a temperature transform circuit, a radio frequency induction coil, a radio frequency interface circuit and a MCU control circuit, etc. The temperature sensor contacts with the copper connection pipe or a conductor core of the cable joint directly.

The temperature sensor can be a thermocouple, a platinum resistor, or a semiconductor means. The temperature transform circuit is adapted to transform the output signal of the temperature sensor into the analog or digital signals recognizable by the MCU. The radio frequency induction coil is adapted to receive energy from the outside receiver and exchange data with the outside receiver. The radio frequency interface circuit is adapted to transit signal between the MCU and the radio frequency induction coil.

According to a further object of the invention, wherein the outside receiver includes a radio frequency transmission and interface circuit, a radio frequency signal antenna, a MCU control circuit, and a remote communication interface circuit. The radio frequency transmission and interface circuit is adapted to receive the control signal and the data signal sent from the MCU control circuit and transmit them to the built-in temperature measurer via the radio frequency signal antenna, at the same time, the radio frequency transmission and interface circuit receives the response signal transmitted by the built-in temperature measurer via the radio frequency signal antenna, and sends it to the MCU control circuit, The MCU reads the temperature value on the basis of the acquired signal decode.

According to a further object of the invention, wherein the radio frequency signal antenna of the outside receiver is made up of a set of receiving coils circularly disposed around the outer fringe of built-in temperature measurer, one or more magnetic core coils are used to connect in series as a receiving coil and placed outside the built-in temperature measurer along one side or more sides.

Element names indicated by the reference numbers in the figures are listed as follow:

1. copper core wire,
2. copper connection pipe,
3. built-in temperature measurer,
4. outside receiver,
5. radio frequency antenna,
6. insulating sleeve,
7. copper shielding layer,
8. inner insulating layer of cable,
9. armor layer of cable,
10. outer insulating layer of cable,
11. conductor wire,
12. temperature probe,
13. radio frequency induction coil,
14. circuit module of built-in temperature measurer,
15. lateral antenna hole.

BEST MODE FOR CARRYING OUT THE INVENTION

Figure 1:
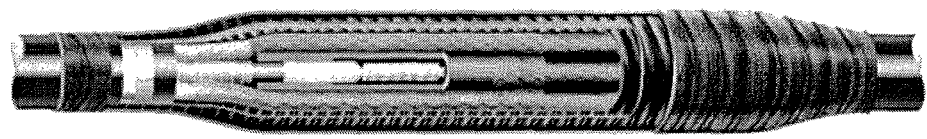
FIG. 1 is a schematic view of an intermediate cable joint for measuring temperature according to the invention.
Figure 2:
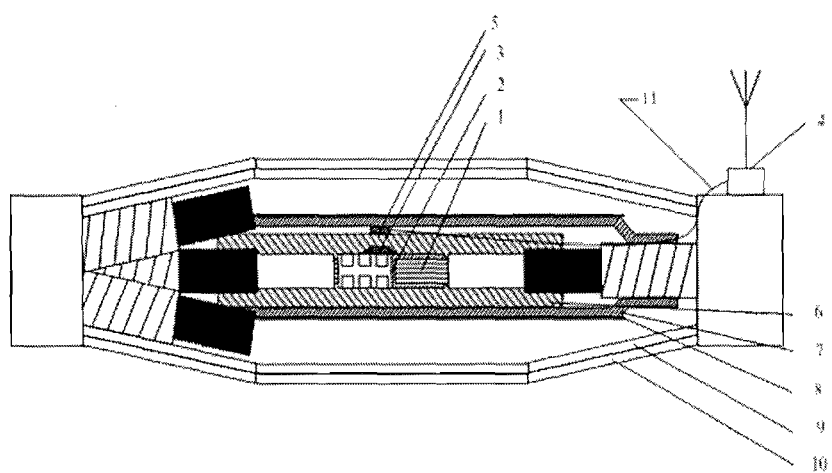
FIG. 2 is an inner structure schematic diagram of the intermediate cable joint for measuring temperature according to the invention.

The basic structure of an intermediate cable joint is seen in cut-away views, which illustrate that conductor cores are connected by a copper connection pipe after the cable joint has fabricated completely. The copper connection pipe is covered exteriorly with an insulating sleeve, and then wrapped with various materials in layers for multilayer protection. As shown in FIG. 2, a temperature measuring device of the invention includes a built-in temperature measurer 3 and an outside receiver 4 etc., they are placed at respective position of the intermediate cable joint on basis of certain technique and connection method. They can realize the objects of accurately measuring temperature of the intermediate cable joint and outputting the temperature and relative parameter signal by mutual matched functions and communication, at the same time, they can resolve the technical problem of the signal penetrating insulating layers. The specific structure is shown in FIG. 2 (wherein the black portion shows the parts of the present device other than connection conductor wires). Wherein the built-in temperature measurer 3 is located between a copper core wire 1 or the copper connection pipe 2 of the cable joint and the insulating sleeve 6, and measures the temperature of the copper core wire 1 or the copper connection pipe 2 of the intermediate cable joint by means of direct contact measurement, and the temperature data are transmitted by means of radio frequency signal after processed. A radio frequency antenna 5 of the outside receiver is located between the insulating sleeve and the insulating layer, and a portion of the outside receiver 4 can be located at another position outside the insulating sleeve 6 on the basis of various structures of the cable joints, conductor wires connect between the receiver and the antenna. The outside receiver 4 is adapted to receive the temperature data transmitted by the built-in temperature measurer 3 and send it to a remote server, a mobile telephone, or other terminals on the distal end via a remote communication interface circuit by wired or wireless means.

The temperature measuring device is divided into two parts: the built-in temperature measurer 3 and the outside receiver 4. The built-in temperature measurer 3 is located between the copper connection pipe 2 connecting two cable joint segments and the insulating sleeve 6 (as shown in FIG. 2), the outside receiver 4 is located outside the insulating sleeve 6. The outside receiver 4 can transmit the radio frequency signal, supplying power energy to the built-in temperature measurer 3 and communicate data with the built-in temperature measurer 3 at the same time. The built-in temperature measurer 3 doesn't have an external power source, the circuits in the built-in temperature measurer are supplied power by a radio frequency induction coil 13 (see FIG. 7) receiving the radio frequency signal transmitted by the outside receiver 4 and through a power supply transform circuit.

Figure 3:
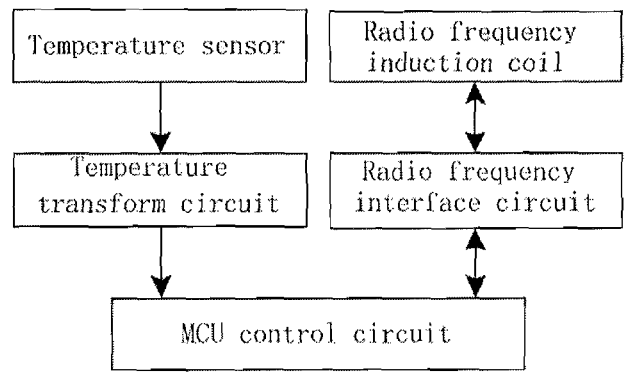
FIG. 3 is a temperature measuring schematic diagram of a built-in temperature measurer for measuring temperature according to the invention.
Figure 5:
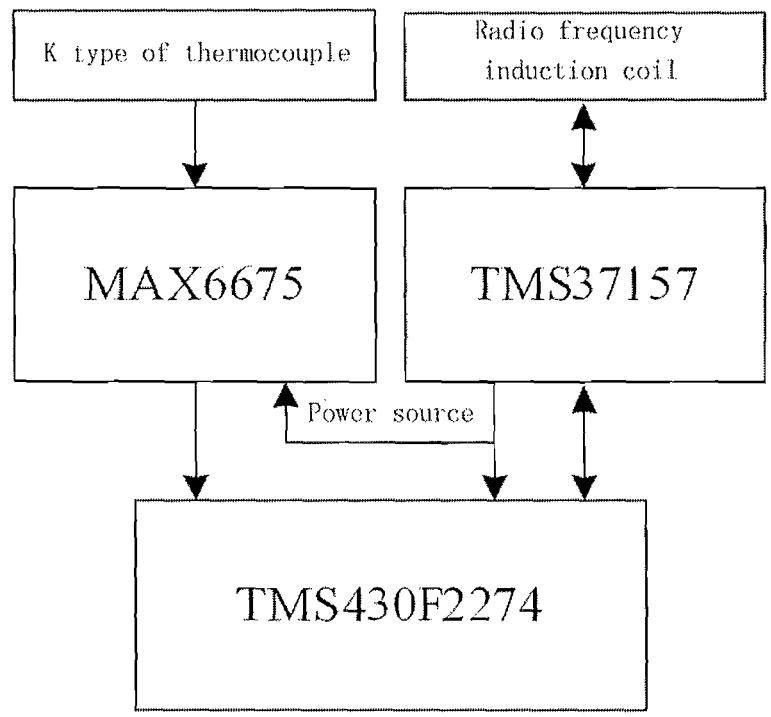
FIG. 5 is a block diagram of the built-in temperature measurer for measuring temperature according to the invention.
Figure 7:
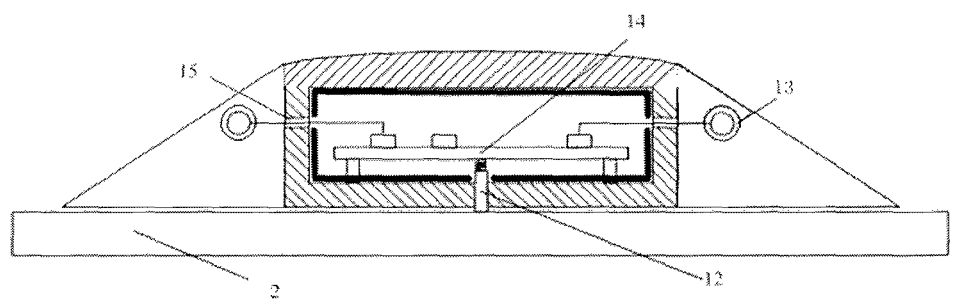
FIG. 7 is a schematic view of the basic structure of the built-in temperature measurer for measuring temperature according to the invention.

The built-in temperature measurer includes a temperature sensor, a temperature transform circuit, a radio frequency induction coil, a radio frequency interface circuit and a MCU control circuit (FIG. 3). The temperature sensor contacts with the copper connection pipe 2 or a conductor core of the cable joint directly. The temperature sensor can be a thermocouple, a platinum resistor, or a semiconductor means. The temperature transform circuit needs to match with the temperature sensor, when the temperature sensor is a K type of thermocouple, the temperature transform circuit can be the MAX6675, and connect to a MCU digital pass interface directly. The temperature transform circuit also can run at low power consumption, and send the temperature signal to the MCU for AD sampling after magnifying the temperature signal. The radio frequency induction coil can be an induction coil with a magnetic core or a hollow annular coil, is located outside the built-in temperature measurer in the shape of ring or rectangle, and connects to a built-in circuit through a lateral antenna hole. The radio frequency interface circuit can be the radio frequency interface chip TMS37157 of TI Inc. The MCU can be the TMS430F2274 of TI Inc. or the ATTINY24 of ATMEL Inc., etc. FIG. 5 is a block diagram of the built-in temperature measurer. FIG. 7 is a schematic view of the basic structure of the built-in temperature measurer.

Figure 4:
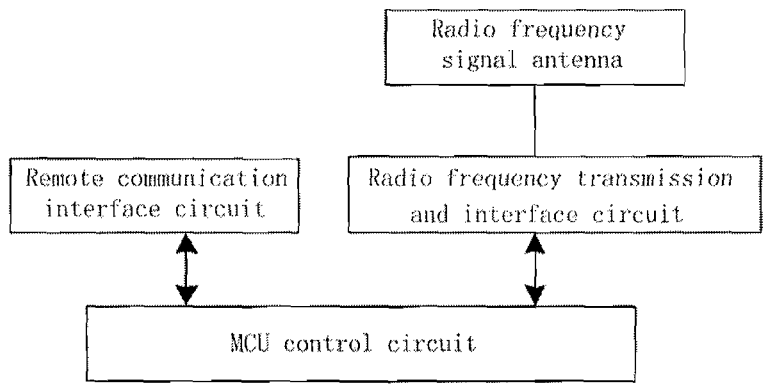
FIG. 4 is a schematic diagram of the built-in temperature measurer in communication with an exterior apparatus for measuring temperature according to the invention.
Figure 6:
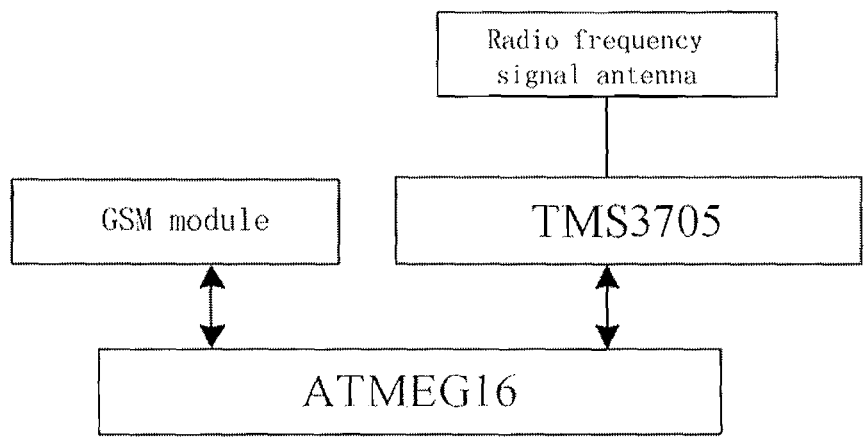
FIG. 6 is a block diagram of an outside receiver for measuring temperature according to the invention.

The outside receiver includes a radio frequency transmission and interface circuit, a radio frequency signal antenna 5, a MCU control circuit and a remote communication interface circuit (as shown in FIG. 4). The radio frequency transmission and interface circuit receives the control signal and the data signal sent from the MCU control circuit and transmit them to the built-in temperature measurer 3 via the radio frequency signal antenna 5, at the same time, the radio frequency transmission and interface circuit receives the response signal transmitted by the built-in temperature measurer via the radio frequency signal antenna, and sends it to the MCU control circuit, The MCU reads the temperature value on the basis of the acquired signal decode. The radio frequency signal antenna can be a hollow annular coil, is placed outside the insulating sleeve for centrically corresponding to the built-in temperature measurer. The radio frequency transmission and interface circuit can be the TMS3705 of TI Inc., the MCU control circuit can be the AVR series of ATMEL, the STM32 series of ST, the TMS3705 series MCU of TI, and it may add an external power source, a crystal vibration and the other peripheral circuits. The remote communication interface circuit can be the RS485, CAN, RS232 and other interface chips, such as MAX3082, MAX485, 82C251 and so on. It also can be an optical fiber receiving and transmitting module or a GPRS, GSM module. FIG. 6 is a block diagram of the outside receiver.

While the preferable embodiments of the invention have been described with reference to the foregoing description and the figures, it is understood that various additions, changes and substitutions can be made without departing from the spirit of the invention. Those skilled in the art understand that the invention can be embodied by means of other special formations, structures, arrangememts, proportions and other elements, materials and parts without departing from the spirit or essential feature of the invention. Those skilled in the art understand that the structures, arrangements, proportions, materials and parts and many other changes can be used to embody the invention, these cha. The invention is not intended to be limited to the embodiments disclosed herein. nges are suitable for the special enviroments and the operative needs without departing from the principle of the invention. So the foregoing embodiment is provided for the purpose of explanation and is not to be construed as limiting the scope of the invention

What is claimed is:

1. A temperature measuring device for an underground power cable joint comprising a copper connection pipe connecting two cable segments of an underground cable and an insulating sleeve covering the connection pipe, the temperature measuring device comprising:
   a built-in temperature measurer located on the underground cable joint between the connection pipe and the insulating sleeve, the built-in temperature measurer operative to exchange data with an external receiver by a radio frequency identification (RFID) technique and comprising a radio frequency induction coil operative to receive power in the form of a radio frequency signal and having a power supply transform circuit for the received power supplying all circuitry in the built-in temperature measurer, the built-in temperature measurer not comprising another power source;

a radio-frequency antenna located on the underground cable outside the insulating sleeve, aligned with the built-in temperature measurer and operative to receive temperature data from the built-in temperature measurer by the RFID technique and to supply power to the built-in temperature measurer by radio frequency induction;

an outside receiver located on the underground cable outside the insulating sleeve, separate from the radio frequency antenna and connected to the radio frequency antenna by a conducting wire.

2. The temperature measuring device according to claim 1, which is operative in use to:

pick up the temperature data in the cable joint by the built-in temperature measurer;

process by the built-in temperature measurer the temperature data picked up;

transmit the processed temperature data by the RFID technique from the built-in temperature measurer to the radio frequency antenna;

receive the transmitted signal by the outside receiver in a corresponding receiving mode; and transfer the received signal by the outside receiver to an identification reader.

3. The temperature measuring device according to claim 1, wherein:

the built-in temperature measurer includes a temperature sensor, a temperature transform circuit, a radio frequency induction coil, a radio frequency interface circuit and a MCU control circuit;

the temperature sensor is a thermocouple, a platinum resistor, or a semiconductor device;

the temperature sensor directly contacts the copper connection pipe or a conductor core of the cable joint;

the temperature transform circuit is adapted to transform an output signal of the temperature sensor into analog or digital signals recognizable by the MCU;

the radio frequency induction coil is adapted to receive energy from the outside receiver and exchange data with the outside receiver by way of the radio frequency antenna; and the radio frequency interface circuit is adapted to transfer signals between the MCU and the radio frequency induction coil.

4. The temperature measuring device according to claim 1, wherein the outside receiver further includes:

a radio frequency transmission and interface circuit;
an MCU control circuit; and
a remote communication interface circuit; and wherein the radio frequency transmission and interface circuit is adapted to receive control signals and data signals sent from the MCU control circuit and transmit them to the built-in temperature measurer via the radio frequency antenna, and to receive response signals transmitted by the built-in temperature measurer via the radio frequency antenna, and send the response signal to the MCU control circuit; and the MCU control circuit is adapted to read a temperature value from the built-in temperature sensor by decoding the response signal.

5. A method of measuring a temperature of an underground power cable joint comprising a copper connection pipe connecting two cable segments of an underground cable and an insulating sleeve covering the connection pipe, the method comprising:

providing a temperature measuring device comprising:

a built-in temperature measurer located on the underground cable joint between the connection pipe and the insulating sleeve, the built-in temperature measurer operative to exchange data with an external receiver by a radio frequency identification (RFID) technique and comprising a radio frequency induction coil operative to receive power in the form of a radio frequency signal and having a power supply transform circuit for the received power supplying all circuitry in the built-in temperature measurer, the built-in temperature measurer not comprising another power source;

a radio-frequency antenna located on the underground cable outside the insulating sleeve, aligned with the built-in temperature measurer and operative to receive temperature data from the built-in temperature measurer by the RFID technique and to supply power to the built-in temperature measurer by radio frequency induction; and an outside receiver located on the underground cable outside the insulating sleeve, separate from the radio frequency antenna and connected to the radio frequency antenna by a conducting wire;

picking up the temperature data in the cable joint by the built-in temperature measurer;

processing by the built-in temperature measurer the temperature data picked up;

transmitting the processed temperature data by the RFID technique from the built-in temperature measurer to the radio frequency antenna;

receiving the transmitted signal by the outside receiver in a corresponding receiving mode; and transferring the received signal by the outside receiver to an identification reader.

* * * * *